(12) United States Patent
Antoine et al.

(10) Patent No.: US 12,000,752 B2
(45) Date of Patent: Jun. 4, 2024

(54) DEFLECTOMETRY MEASUREMENT SYSTEM

(71) Applicant: LAMBDA-X OPHTHALMICS, Nivelles (BE)

(72) Inventors: Philippe Antoine, Walhain (BE); Didier Beghuin, Herne (BE); Luc Joannes, Gembloux (BE)

(73) Assignee: LAMBDA-X OPHTHALMICS, Nivelles (BE)

( * ) Notice: Subject to any disclaimer, the term of this patent is extended or adjusted under 35 U.S.C. 154(b) by 76 days.

(21) Appl. No.: 17/605,051

(22) PCT Filed: Apr. 24, 2020

(86) PCT No.: PCT/EP2020/061480
§ 371 (c)(1),
(2) Date: Oct. 20, 2021

(87) PCT Pub. No.: WO2020/216914
PCT Pub. Date: Oct. 29, 2020

(65) Prior Publication Data
US 2022/0187161 A1 Jun. 16, 2022

(30) Foreign Application Priority Data

Apr. 24, 2019 (BE) .................................. 2019/5272

(51) Int. Cl.
*G01M 11/02* (2006.01)
*G01N 21/45* (2006.01)
(Continued)

(52) U.S. Cl.
CPC .... *G01M 11/0228* (2013.01); *G01M 11/0207* (2013.01); *G01N 21/455* (2013.01);
(Continued)

(58) Field of Classification Search
CPC .......... G01M 11/0228; G01M 11/0207; G01N 21/455; G01N 2021/1765;
(Continued)

(56) References Cited

U.S. PATENT DOCUMENTS 2,642,770 A * 6/1953 Zobel ..................... G02B 27/54
359/857
4,728,185 A * 3/1988 Thomas ................. H04N 1/036
353/122
(Continued)

FOREIGN PATENT DOCUMENTS

CN 103913288 B * 11/2016
JP 2000-019102 A 1/2000
(Continued)

OTHER PUBLICATIONS

Luc Joannes, Frank Dubois, and Jean-Claude Legros, "Phase-shifting schlieren: high-resolution quantitative schlieren that uses the phase-shifting technique principle," Appl. Opt. 42, 5046-5053 (2003).*
(Continued)

*Primary Examiner* — Hwa Andrew Lee
(74) *Attorney, Agent, or Firm* — Morgan, Lewis & Bockius LLP

(57) ABSTRACT

A system for measuring (200) a sample (2) by deflectometry comprising:
a source (10) for generating a light beam in a source plane (105);
an illumination module (19) for forming an illumination beam (9) comprising:
a first converging optical element (18);
a first selection optical element (16) with a first aperture (160);
reflective matrix optical modulation means (30) to form a pattern (7), said first aperture (160) being configured to
(Continued)

control the angles of said illumination beam (9) on said reflective matrix optical modulation means (30);

a Schlieren lens (20) for obtaining an angle-intensity encoding of said pattern (7) on the sample (2);

imaging (40) and detecting means (50) for detecting an image of said sample (2).

18 Claims, 11 Drawing Sheets

(51) Int. Cl.
| | | |
|---|---|---|
| *G02B 27/14* | (2006.01) | |
| *G02B 27/54* | (2006.01) | |
| *G02F 1/1362* | (2006.01) | |
| *G01N 21/17* | (2006.01) | |

(52) U.S. Cl.
CPC ........... *G02B 27/149* (2013.01); *G02B 27/54* (2013.01); *G02F 1/136277* (2013.01); *G01N 2021/1765* (2013.01); *G01N 2021/456* (2013.01); *G02F 2203/50* (2013.01)

(58) Field of Classification Search
CPC ............ G01N 2021/456; G02B 27/149; G02B 27/54; G02F 1/136277; G02F 2203/50
See application file for complete search history.

(56) References Cited

U.S. PATENT DOCUMENTS

| | | | |
|---|---|---|---|
| 5,515,158 A * | 5/1996 | Heineck | G01N 21/455 |
| | | | 356/129 |
| 9,232,117 B2* | 1/2016 | Buckner | G01N 21/45 |
| 2003/0039036 A1* | 2/2003 | Kruschwitz | H04N 9/3132 |
| | | | 359/623 |
| 2005/0036153 A1* | 2/2005 | Joannes | G02B 27/54 |
| | | | 356/518 |

FOREIGN PATENT DOCUMENTS

| | | | |
|---|---|---|---|
| JP | 2000019102 | * | 1/2000 |
| WO | 03/048837 A2 | | 6/2003 |

OTHER PUBLICATIONS

Joannes et al., "Phase-shifting schlieren: high-resolution quantitative schlieren that uses the phase-shifting technique principle," Applied Optics, 42 (25): 5046-5053 (2003).

Nguyen et al., "Non-Interferometic Tomography of Phase Objects Using Spatial Light Modulators," Journal of Imaging, 2 (4): 30 (2016).

Buckner et al., "Digital focusing schlieren imaging," Visual Communications and Image Processing, 9576 (2015).

International Search Report issued in corresponding International Patent Application No. PCT/EP2020/016480 dated Jun. 9, 2020.

* cited by examiner

DEFLECTOMETRY MEASUREMENT SYSTEM

TECHNICAL FIELD

According to a first aspect, the invention relates to a deflectometry measuring system.

PRIOR ART

In the optical industry, it is important to characterize optical elements accurately, completely and if possible automated. In particular, when developing or producing custom-made corrective lenses or glasses with complex curvatures, it is desirable to be able to check that each product is conformed to given specifications.

When a refractive object is illuminated, the wavefront passing through it is modified according to the shape and the refractive index of the object. The intensity of the light will also be affected by the optical transmission properties of the object. Similarly, when the light is reflected, the shape of the reflective surface of the object under study will affect the wavefront and the intensity of the reflected light. The optical characteristics of the refractive or reflective object can thus be determined by measuring the changes in the wavefront and/or the intensity of a light beam that has interacted with it.

A phase shift measuring method is known for its application in particular in deflectometry, interferometry, or profilometry. The phase shift deflectometry is a proven method for measuring the deflection maps of light through a lens or a mirror. The phase shift deflectometry requires the acquisition of several images for a same object to be measured. Such a method can be used for 'real time' measurements by acquiring several images during a sufficiently short time interval.

The phase shift methods are also used in fields other than the characterization of optical elements, such as the inspection of semiconductor wafers, flat glass panels, plastic sheets, etc., where the shape and/or the surface finish of optically reflective and/or refractive objects must be inspected accurately and efficiently.

EP 1 454 183 B1 describes a system for measuring optical elements by deflectometry. The system of EP 1 454 183 B1 proposes to acquire multiple successive images of a single optical element. For each image, a pattern is projected onto the object to be analyzed so that the intensity of the pattern on the object to be analyzed varies according to the angles of incidence. The system described in EP 1 454 183 B1 shows limitations in terms of acquisition speed of the images and measurement accuracy.

SUMMARY OF THE INVENTION

According to a first aspect, one of the purposes of the present invention is to provide a deflectometry measuring system that allows for a higher acquisition speed and a better measurement accuracy.

To this end, the inventors propose a system for measuring a sample by deflectometry comprising:
  a source for generating a light beam in a source plane;
  an illumination module comprising:
    a first converging optical element;
    a first selection optical element having a first aperture, the first selection optical element being positioned between the source plane and the first converging optical element;
    the illumination module being configured to generate an illumination beam from the light beam of the source;
  matrix optical modulation means in reflection for forming a pattern from the illumination beam;
  the first aperture being configured to control angles of incidence of the illumination beam on the matrix optical modulation means in reflection;
  a Schlieren lens;
  the measuring system being configured such that the pattern is adapted to illuminate the Schlieren lens so as to obtain an angle-intensity encoding of the pattern into an inspection light beam;
    imaging means for forming an image of said sample after interaction of said inspection light beam with said sample;
  matrix detection means for detecting the image of said sample formed by the imaging means.

The deflectometry measuring system of the invention allows to improve the acquisition speed thanks to an increase in the brightness of the light beam projected onto the object to be studied compared to the solution of EP 1 454 183 B1. The deflectometry measuring system of the invention also allows to improve the acquisition speed thanks to a higher speed of the modulation means in reflection. The system of the invention also allows to obtain a better quality of measurement thanks to a better control of the intensity according to the angle of the light beam projected onto the object to be studied.

An advantage of the system of the invention is to allow a good accuracy of measurement thanks to the control of stray lights. The control of the stray lights and in particular their reduction or even their suppression is a critical parameter because any stray light degrades the quality of the image of the object studied which is recorded by the matrix detection means (camera). A poor control of the stray lights can have significant consequences following the angle-intensity encoding. Indeed, any error in the measurement of the recorded intensity (due to the stray lights, for example) may result in an error in the estimation of the refraction or reflection angle of the sample. A sample is an optical element under study or an optical element to be measured. An effective solution is to illuminate the optical modulation means with a light beam whose sizes and divergence are controlled with accuracy so as to keep only those light rays that will illuminate the useful field of view of the element under study and whose direction is included in the angular acceptance of the optical deflectometry measuring system.

The influence of stray lights is reduced with the measuring system of the invention, which allows to generate a spatially limited light beam on the matrix modulation means and which comprises a first aperture at the level of the first selection optical element, limiting the size of the field of view illuminated by the inspection beam. The first aperture corresponds to the field diaphragm of the deflectometry measuring system. The measuring system of the invention allows the extended light source to be imaged onto the matrix optical modulation means in reflection. This configuration of the system offers the advantage that the angles of incidence on the matrix optical modulation means and therefore the angles after reflection on the matrix optical modulation means are limited by the first aperture placed in the illumination module, upstream of the first converging optical element.

The matrix optical modulation means deflects the beam generated by the illumination module towards the Schlieren lens by incorporating a pattern. Thus, the measuring system of the invention allows to reduce very strongly the stray lights, source of noise on the camera, and thus of degradation of the performances of the measuring system.

Thanks to the control of the field of view and the angular divergence, the measuring system of the invention allows to limit the stray lights. In other words, the limitation of the stray lights is achieved by controlling the field of view and the angular divergence. In particular, the ratio of the size of the first aperture to the focal length of the first converging optical element of the illumination module allows the field of view to be controlled at the level of the object to be measured.

This control of the stray lights by the measuring system of the invention is particularly important because the deflectometry measurement is based on a measurement of the intensity which encodes the angle of refraction or reflection induced by an optical element to be measured. When the test object is measured, it deflects (by refraction or reflection) an incident beam. For a measurement of the entire object to be tested, the angular distribution of the projected pattern must include at least all the deflection angles induced by the object to be tested. In order to reduce the stray lights, it is desired to have an angular distribution of the pattern projected onto the object to be tested that is minimal, i.e. that is adjusted to the object to be tested. For example, if the object to be tested is a lens with a 10° deflection of an incident beam, then the angular distribution of the projected pattern is limited to 10°. If another lens has a deviation of 20°, then the angular distribution of the projected pattern must be adapted accordingly by increasing the size of the spatially limited light beam on the matrix optical modulation means.

Indeed, the measurement of optical elements and in particular the contact lenses or the intraocular lenses requires: a large field of view for contact lenses or a large angular acceptance for the intraocular lenses.

The system of the invention thus allows to limit the generation of stray lights by illuminating the matrix optical modulation means with a beam whose sizes are controlled with accuracy so as to retain only the useful light rays. The useful light rays are those which illuminate the field of view of the area to be measured (of the object to be measured) and whose angular distribution corresponds to the object to be measured.

The system of the invention allows an increase in the brightness of the projected light beam compared to EP 1 454 183 B1. This is partly achieved by reducing the losses of brightness during the formation of the projected pattern. The system of the invention proposes a formation of the pattern by matrix optical modulation means in reflection. Indeed, optical modulation means, allowing to define the pattern to be projected, when used in transmission induce significant losses of luminosity. The use of matrix optical modulation means in reflection to form the pattern to be projected allows a significant reduction in losses during the generation of the pattern.

The system of the invention allows to have a low dependence, or even an independence of the illumination intensity depending on the direction of the light downstream of the optical modulation means compared to EP 1 454 183 B1. If, after interaction with matrix optical modulation means, the propagation of the light beam defining the pattern is not isotropic, i.e. the intensity of the light depends on its direction, then an intensity variation will result which will induce a non-uniformity of angle-intensity encoding and thus an error in the measurement of the refraction/reflection angle of the optical element to be measured. This characteristic is particularly important because the deflectometry measurement is a measurement based on an angle shift measurement which requires the projection of several patterns and thus inducing (between two projected patterns shifted in phase) a variation of the intensity of the pattern locally. However, a transmission projection liquid crystal device as described in EP 1 454 183 B1 shows a variation in intensity as a function of the angle at which the light is transmitted. This is not the case with the measuring system of the invention which uses matrix optical modulation means in reflection, thus making the measuring system more accurate. In other words, in the case of transmission matrix modulation means, these suffer from a transmission coefficient that depends on the direction of the light at their level. This results in an angle-intensity encoding that is not independent of the position in the field of view. This parasitic effect is non-existent with the matrix modulation means in reflection of the invention.

The measuring system of the invention is particularly accurate because the Schlieren lens is configured to compensate for aberrations induced by the beam splitting means, for example, so as to have a normal incidence on the matrix optical modulation means. Preferably, the Schlieren lens and polarizing splitter cube pair are configured so that they minimize overall aberrations. For example, the Schlieren lens is configured so that it minimizes the aberrations introduced by the polarizing splitter cube in order to minimize the overall aberrations in the measuring system. The configuration of the Schlieren lens according to the aberrations introduced by the polarizing splitter cube allows an improvement of the measurement accuracy of the measuring system of the invention. Preferably, the Schlieren lens consists of a plurality of refractive lenses. Preferably, the Schlieren lens is positioned between the matrix optical modulation means and the imaging means along an optical path of a light beam generated by the source when the latter is activated. More preferably, the matrix optical modulation means are positioned in a focal plane of the Schlieren lens in the presence of the polarizing splitter cube.

Preferably, the first selection optical element with the first aperture is positioned in the object focal plane of the first converging optical element. It could be called the first converging optical element of the first converging optical means, without changing the meaning of this characteristics. An equivalent formulation would be to say that the first aperture is configured to control angles of incidence of a beam resulting from said illumination beam on the matrix optical modulation means in reflection.

Preferably, the matrix optical modulation means are positioned in a modulation plane optically conjugate to the source plane, the illumination beam being spatially limited at the level of the matrix optical modulation means in reflection by at least one of the following means:
- a second selection optical element having a second aperture positioned in the source plane;
- a third selection optical element having a third aperture positioned in the modulation plane;
- a source comprising a spatially limited light source, preferably the light source being a light emitting diode (LED) matrix.

The illumination beam is spatially limited at the level of said matrix optical modulation means meaning that the illumination beam illuminates the matrix optical modulation means with a predefined size. The size of the illumination beam is limited in the source plane or the modulation plane which are optically conjugate. The advantage of spatially limiting the illumination beam at the level of the matrix optical modulation means allows to have a well-defined (spatially limited) illuminated area on the matrix optical modulation means by the spatially limited light beam. The first or second selection optical elements are aperture diaphragms of the deflectometry measuring system. In the sense of this embodiment, it should be understood that there is a positioning tolerance when interpreting the term optically conjugate and in particular that when the modulation plane is optically conjugate to the source plane, the system of the invention also works when the modulation plane is not strictly optically conjugate to the source plane due to the possible positioning tolerance.

The sizes of the spatially limited light beam on the matrix optical modulation means allow a control of the angular distribution of the projected pattern, thus defining the angular acceptance of the optical system of the invention. It is important that the angular distribution of the projected pattern is consistent with the characteristics of the Schlieren lens.

Preferably, the source comprises a filter to spectrally filter the light beam.

Preferably, said matrix optical modulation means in reflection are positioned in an image plane of the illumination module which is conjugate to said source plane. For example, the image plane of the illumination module coincides with the modulation plane.

Preferably, said first selection optical element is positioned in an object focal plane of the first converging optical element.

This embodiment allows the acquisition by the matrix detection means of an image of an optical element to be measured with sharp contours. This preferred embodiment allows to use an image of an optical element to be measured in its entirety. Preferably, the object focal plane of the first converging optical element is the position where the angles of the illumination beam illuminating the matrix optical modulation means are best controlled. The purpose of positioning the first aperture in the object focal plane is to control the angles of the illumination beam at the level of the modulation plane. Thus, an offset of the first aperture on either side of the object focal plane of the first converging optical element should be understood as being in the object focal plane. Such an offset should be understood as a tolerance in the positioning of these different elements between them.

Preferably, the measuring system further comprises:
a third selection optical element having a third aperture, the third selection optical element being positioned at the level of the matrix optical modulation means.

Preferably, the illumination module is an illumination module 4F comprising:
a second converging optical element positioned between the source and the first selection optical element, and configured such that:
its object focal plane coincides with the source plane;
its image focal plane coincides with the object focal plane of the first converging optical element positioned between the first and second converging optical elements,
the image plane of the illumination module coincides with the image focal plane of the first converging optical element.

Preferably, the first and/or second converging optical element comprises a first and a second converging lens aligned at a distance of between 0 mm and 10 mm.

Preferably, the matrix optical modulation means are matrix phase modulation means.

The advantage of using matrix phase modulation means is to allow a fixed (normal) reflection angle of the illumination beam on the matrix phase modulation means. This allows to simplify the optical design of the deflectometry measuring system of the invention. The use of phase modulation means allows to exploit the polarization properties of the light.

Preferably, the matrix phase modulation means comprises a liquid crystal on silicon matrix.

The use of phase modulation means of the liquid crystal on silicon (or LCOS) matrix type is an effective solution which, thanks to the whole system of the invention, allows to respond to all the aforementioned disadvantages of the prior art: it allows a better illumination intensity and therefore reduced exposure times per image, as well as a better accuracy measurement thanks to the better homogeneity of the intensities of the pattern for one angle of incidence on the optical element to be measured. A liquid crystal on silicon matrix has a high speed of the modulation means, a high speed in this case means the time needed to change a pixel from no induced polarization to a 90° polarization. A liquid crystal on silicon matrix also allows to have minimal losses of light intensity during the reflection of the beam on the liquid crystal on silicon matrix.

In order to take full advantage of the liquid crystal on silicon matrix, it is desired to use it with an incident (e.g. collimated) illumination beam having an incidence perpendicular to its surface, so that the reflected beam is also perpendicular to its surface.

Thus, preferably, the measuring system of the invention further comprises:
beam splitting means configured so as to obtain from the illumination beam resulting from the illumination module:
a first light beam deflected by the beam splitter along a first optical path directed towards the matrix optical modulation means;
a second light beam transmitted by the beam splitter along a second optical path resulting from a reflection of the first light beam deflected by the matrix optical modulation means.

Preferably, the first and second optical paths are parallel.

Preferably, the measuring system of the invention further comprises:
beam splitting means configured to obtain from the illumination beam resulting from the illumination module:
a first light beam transmitted by the beam splitter along a first optical path directed towards the matrix optical modulation means;
a second light beam deflected by the beam splitter along a second optical path resulting from a reflection of the first light beam transmitted by the matrix optical modulation means.

Preferably, the first and second optical paths are perpendicular.

Thanks to the beam splitting means, the optical design of the projection device can be simplified by the perpendicular illumination of the surface of the matrix optical modulation means. The beam splitting means allow the pattern to be projected by separating the polarization-changed and non-polarization-changed components of the reflected light beam. Thus, the components that define the pattern are those that have undergone a polarization change. These components are therefore directed in a different direction than those that have not had their polarization changed by the matrix optical modulation means. In the case of an LCOS, it is strongly recommended that a polarizing splitter cube be used so that the beam reflected from the LCOS is filtered by the splitter cube so that only those components of the beam whose polarization has been modified by the LCOS are projected.

The preferred embodiment combining a LCOS with a polarizing cube allows to reduce the light losses by exploiting the polarization properties of the light. Indeed, this allows to significantly reduce the inevitable losses during the separation of the two beams: these losses are higher than 75% with a classical optic (non-polarizing) whereas they can be reduced to 50% with a polarizing splitter (e.g. beam splitter cube).

The beam splitting means that can be used are, in a non-exhaustive way: semi-reflective plate, polarizing splitter plate, plate oriented with a Brewster angle, polarizing splitter cube etc.

Preferably, the beam splitting means comprise a polarizing beam splitter, for example a polarizing beam splitter cube.

Preferably, said polarizing beam splitter is configured to obtain from said illumination light beam (e.g. collimated) resulting from the illumination module:
  a first light beam deflected by said polarizing beam splitter along a first optical path and directed towards said phase modulation means;
  a second light beam transmitted by the polarizing beam splitter along a second optical path resulting from a reflection of the first light beam deflected by the two-dimensional phase modulation means.

Preferably, the illumination beam resulting from the illumination module is directed along an optical axis A, the polarizing beam splitter is configured such that the optical axis A is perpendicular to the second optical path.

Preferably, the source comprises a light source and a second selection means having a second aperture for spatially limiting a light beam resulting from the light source.

Preferably, the second selection means is positioned in the source plane.

Preferably, the source comprises a spatially limited light source, for example the light source is a LED matrix.

Preferably, the source comprises a matrix of light sources, for example LEDs positioned so as to generate a spatially limited light beam.

The second selection optical element allows to limit spatially a light beam generated by one or more light sources.

The positioning of the second selection optical element in the source plane allows the second aperture on the matrix optical modulation means to be imaged with the illumination module.

Preferably, the light beam is spatially limited according to a spatially limited light beam surface area $S_{10}$, and, the matrix optical modulation means have an optical modulation surface area $S_{30}$ such that:

$$\frac{S_{30}}{S_{10}} = \gamma,$$

where $\gamma$ is the magnification factor of the illumination module, so that:

$$\gamma = \frac{f_1}{f_2},$$

where $f_1$ is the focal length of the first converging optical element and $f_2$ is the focal length of the second converging optical element.

Preferably, the first aperture has a first aperture surface area of less than 50 mm², for example 36 mm², preferably less than 25 mm² and even more preferably less than 10 mm². In a preferred embodiment, the first aperture is circular.

Preferably, the first aperture is centered on the optical axis A.

For example, the imaging means may be a system referred to as 4F comprising two converging optical elements. The first converging optical element has a focal length of 25 mm and the second converging optical element has a focal length of 25 mm. Preferably, the first and/or second converging optical elements each comprise a pair of lenses, each lens having a focal length of 50 mm. The lenses of a pair of lenses are preferably separated by a distance of between 0 mm and 10 mm, more preferably 1 mm. For example, the magnification of the 4F illumination module is equal to 1.

Preferably, a LCOS matrix has a diagonal of 21 mm, more preferably it has a side size of 14 mm.

Preferably the first aperture is a diaphragm. For example, the first aperture has a substantially circular aperture cross-section, so as to limit the field of view on the object to be tested in a circular manner. This is important to limit stray lights that could be created by illuminating a portion of an optical element to be measured whose optical properties are not being measured. For example, when measuring an intraocular lens, it would be preferable to illuminate only the portion of the lens that has an optical function. However, the measuring system of the invention allows good visualization of the edges or the haptics of an intraocular lens. It is therefore preferable to illuminate the portion having an optical function as well as a portion around it, for example if the portion having an optical function is a disc, it is preferable to illuminate a 1 mm thick ring around the disc.

In addition, it is particularly desirable to have an optical projection device allowing to measure objects (lenses, mirrors; refractive, diffractive) which have a high optical power.

Preferably, the measuring system of the invention further comprises:
  a non-planar mirror positioned so as to reflect the second light beam, resulting from a reflection on the matrix phase modulation means, into a third light beam reflected to said beam splitter along a third optical path.

In this configuration, the components of the light beam defining the pattern are not directed in the direction of the optical element to be measured after reflection on the matrix optical modulation means. In fact, the components of the pattern are directed, after reflection on the modulation means, towards a non-planar mirror which reflects the light into the splitter cube. A quarter-wave plate positioned between the non-planar mirror and the splitter cube allows for a reflection in the beam splitter cube when the light beam returns to the cube, so as to direct the pattern towards the Schlieren lens and thus towards the element to be measured. Preferably, the Schlieren lens consists of a plurality of refractive lenses. The combination of Schlieren lens, optical separation means and non-planar mirror must have good optical properties. For example, the Schlieren lens is configured so that it minimizes the aberrations introduced by the polarizing splitter cube as well as by the non-planar mirror in order to minimize the overall aberrations in the measuring system. The configuration of the Schlieren lens according to the aberrations introduced by the polarizing splitter cube as well as by the non-planar mirror allows an improvement of the measurement accuracy of the measuring system of the invention. The advantage of this embodiment, which allows to generate large angles for characterizing an optical element to be measured with high optical power, is that the double passage through the beam splitter cube due to the reflection on the non-planar mirror allows to obtain good optical properties. Thus, when designing the Schlieren lens, it must be designed so as to correct the defects introduced by the cube and the non-planar mirror. More preferably, when designing the Schlieren lens, it should be designed to additionally correct the defects introduced by the refractive lenses and any other optical element of the system (e.g. a prism etc.). Here the defects are not manufacturing defects of the optical elements but essentially aberrations. Such aberrations are often related to shape defects: the light beams interacting alternately with flat (polarizing splitter cube) and spherical (lenses, non-planar mirror, concave mirror) surfaces. It should be noted that the positions, the shapes, the materials and the sizes of the refractive lenses that make up the Schlieren lens are chosen to optimize its overall performance. A functional description of the optical measuring system according to this embodiment indicates that the functionality allowing for obtaining an angle-intensity encoding of an illumination pattern is primarily derived from the non-planar mirror and the Schlieren lens. The contribution to this functionality can be balanced between the non-planar mirror and the Schlieren lens, for example, depending on the focal length of the non-planar mirror and its position.

In this embodiment, the splitter cube is positioned between the matrix phase modulation means and the non-planar mirror. In a preferred embodiment, the non-planar mirror is positioned relative to the modulation means so as to create an image thereof at a great distance, for example at infinity. The refractive lenses of the Schlieren lens essentially act as a telescope, allowing to adapt the diameter and the angles of incidence of the beam to the size of the field of view of the instrument at the level of the lens to be measured. Preferably, the modulation means is positioned at the focal plane of the non-planar (concave) mirror with a positioning tolerance in the presence of the beam splitter cube.

Advantageously, the non-planar mirror is concave. Preferably, the non-planar mirror is a concave mirror with a radius of curvature between 25 mm and 100 mm, preferably between 25 mm and 75 mm, for example the non-planar mirror is a spherical concave mirror with a radius of curvature of 50 mm. For example, the spherical mirror has a diameter between 10 mm and 50 mm, for example a diameter of 25.4 mm.

Advantageously, the beam splitter is a polarizing beam splitter and the measuring system of the invention further comprises:
  a quarter-wave plate positioned between the non-planar (convergent) mirror and the polarizing beam splitting means.

Preferably, the polarizing light beam splitter is configured such that the third light beam reflected by the non-planar mirror along said third optical path is deflected by the polarizing beam splitter into a fourth light beam along a fourth optical path.

Preferably, the polarizing light beam splitter is configured such that the third light beam reflected along the third optical path is transmitted by the polarizing beam splitter into a fourth light beam along a fourth optical path.

In this embodiment, the third and fourth optical paths and the third and fourth light beams are merged.

Preferably, the measuring system of the invention is configured such that:
  the second and third optical paths are essentially parallel, and,
  the optical axis A or the illumination beam and the fourth optical path are substantially parallel.

Preferably, the Schlieren lens is positioned between the projection device and the imaging means.

Preferably, the Schlieren lens is positioned between said illumination module and the imaging means. Preferably, the Schlieren lens is positioned between the beam splitter cube and the imaging means.

The performance of the Schlieren lens is particularly critical because the Schlieren lens defines the encoding of the angle of refraction of the light by the optical element to be measured (the angle of reflection of the light by the mirror to be measured) into intensity. Ideally, this encoding is independent of the position in the field of view. In other words, this encoding is the same for all the positions on the optical element to be measured. This condition depends on two different factors. The first is the absence of distortion. In practice, a pattern generated by the matrix optical modulation means and corresponding to a source point should ideally generate a collimated beam, i.e. a light beam whose rays are all parallel to each other. This beam can be inclined with respect to the optical axis. This distortion degrades the performance of the instrument or makes its calibration more complex. Indeed, the intensity encoding depends on the position in the field of view and possibly on the working distance (distance between the Schlieren lens and the optical element to be measured. Furthermore, any aberration of the Schlieren lens will result in a loss of angular resolution. Indeed, in a simplified view, the light collected by each of the pixels of the image (image detected by the matrix detection means) of the optical element to be measured comes from a single position on the matrix optical modulation means. At each pixel of the image on the camera, the light comes from a position on the matrix optical modulation means. This unique position is in practice a restricted surface defined by the size of the fourth aperture of the imaging means (in front of the camera). The fourth aperture is, for example, a diaphragm. The possible aberrations of the Schlieren lens contribute to extend this surface, which degrades the performance of the instrument. The Schlieren lens is a multi-lens objective whose complexity depends critically on the angular acceptance of the optical instrument, the size of the matrix optical modulation means and the size of the field of view. Specifically, the complexity increases for large angles and small matrix optical modulation means.

When using a liquid crystal on silicon matrix in combination with a polarizing splitter cube, the latter introduces optical aberrations that are likely to significantly degrade the performance of the instrument. The design of the Schlieren lens allows to compensate for these aberrations so that the aberrations of the splitter cube and Schlieren lens combination are minimal. When designing the Schlieren lens, the aberrations of the beam splitter cube (and possibly of the non-planar mirror) are directly integrated into the modeled optical elements so that a Schlieren lens is obtained that offers a very good correction of the aberrations introduced by the beam splitter cube.

The Schlieren lens is positioned in an optical path between the matrix phase modulation means and the imaging means.

Preferably, the imaging means comprise:
a first and a second converging imaging optical elements configured such that an image focus of one coincides with an object focus of the other at a second convergence point located in a second focusing plane positioned between said first and second converging imaging optical elements,
said imaging means being adapted to form an image of the sample from the inspection beam having interacted with the sample on the matrix detection means.

Preferably, the imaging means further comprises:
a fourth selection optical element having a fourth aperture surrounding the second convergence point.

When measuring an optical element in reflection, it is preferable, for example with a concave mirror, to measure it parallel to its optical axis. Thus, it is particularly advantageous to position the optical element to be measured so that its optical axis is parallel to the second optical path of the second light beam interacting with the matrix optical modulation means. Thus the Schlieren lens is positioned between the element to be measured and the beam splitting means so that the light beam reflected by the optical element to be measured in reflection passes back through the Schlieren lens. A quarter-wave plate is then positioned between the optical element to be measured and the polarizing beam splitting means so that the light beam reflected by the optical element to be measured in reflection is deflected by the polarizing beam splitting means towards the imaging means and then towards the matrix optical detector (the quarter-wave plate can be located between the cube and the Schlieren lens or between the Schlieren lens and the mirror to be tested). In this case, the Schlieren lens is both the literal Schlieren lens and the first imaging optical element of the imaging system. This is particularly advantageous and allows for a particularly compact measuring system with a reduced number of optical components.

The interaction of the analyzing beam with the optical element to be measured is a transmission of the analyzing beam with the sample in the case of a refractive or diffractive sample or a reflection in the case of a reflective sample.

Preferably, the fourth aperture is positioned at the level of the image focus of the first imaging optical element and of the object focus of the second imaging optical element so as to let pass essentially the portion of the light beam propagating parallel to the optical axis A.
Preferably, the fourth selection optical element having a fourth aperture is positioned in said second focusing plane.

Preferably, the Schlieren lens is the first imaging optical element, i.e., it replaces the first imaging optical element along an optical path of the inspection beam after it has interacted in reflection with the sample. Thus the Schlieren lens allows the angle-intensity encoding of the inspection beam and allows to obtain an image thanks to the imaging means of which it also belongs. The Schlieren lens fulfills two functions and thus allows the measurement of a sample in reflection with an incidence normal (at its center) to it.

Preferably, the imaging means are imaging means 4F such that:
the first converging optical element is positioned between the Schlieren lens and the fourth selecting means, so that its object focal plane coincides with a plane of said sample and,
the second converging optical element is positioned between the fourth selecting means and the matrix detection means so that its image focal plane coincides with the matrix detection means.

The various embodiments of the optical measuring system of the invention may be implemented alone or in combination.

The optical axis A in the optical system of the invention is considered to be deflected when the light beam is deflected by reflective elements.

BRIEF DESCRIPTION OF FIGURES

These and other aspects of the invention will be clarified in the detailed description of particular embodiments of the invention, reference being made to the drawings of the figures, in which.

The drawings in the figures are not to scale. Generally, similar elements are denoted by similar references in the figures. The presence of reference numbers in the drawings shall not be considered limiting, even when such numbers are indicated in the claims.

DETAILED DESCRIPTION OF SOME EMBODIMENTS OF THE INVENTION

Figure 1:
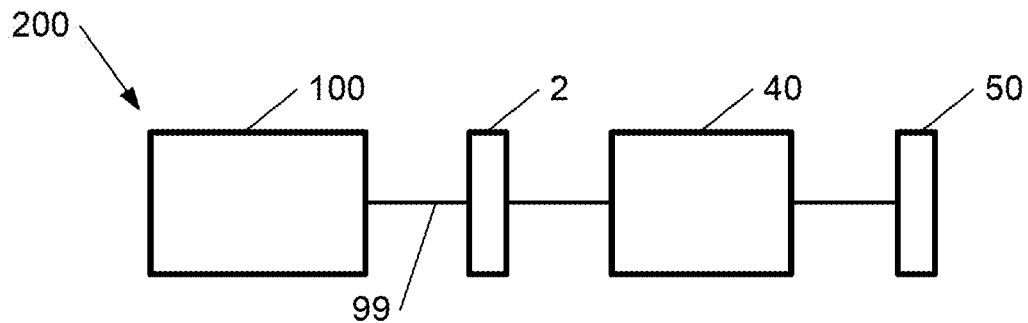
FIG. 1 shows a schematic representation of the measuring system of the invention.

FIG. 1 shows a schematic representation of the deflectometry measuring system 200 of the invention. The measuring system 200 comprises a projection device 100 allowing to project onto the optical element to be measured 2, a pattern whose angle of incidence of that pattern on the optical element to be measured 2 is controlled with accuracy by the projection device. The measuring system 200 further comprises imaging means 40 for forming an image of the optical element to be measured 2 on matrix detection means 50.

Figure 2A:
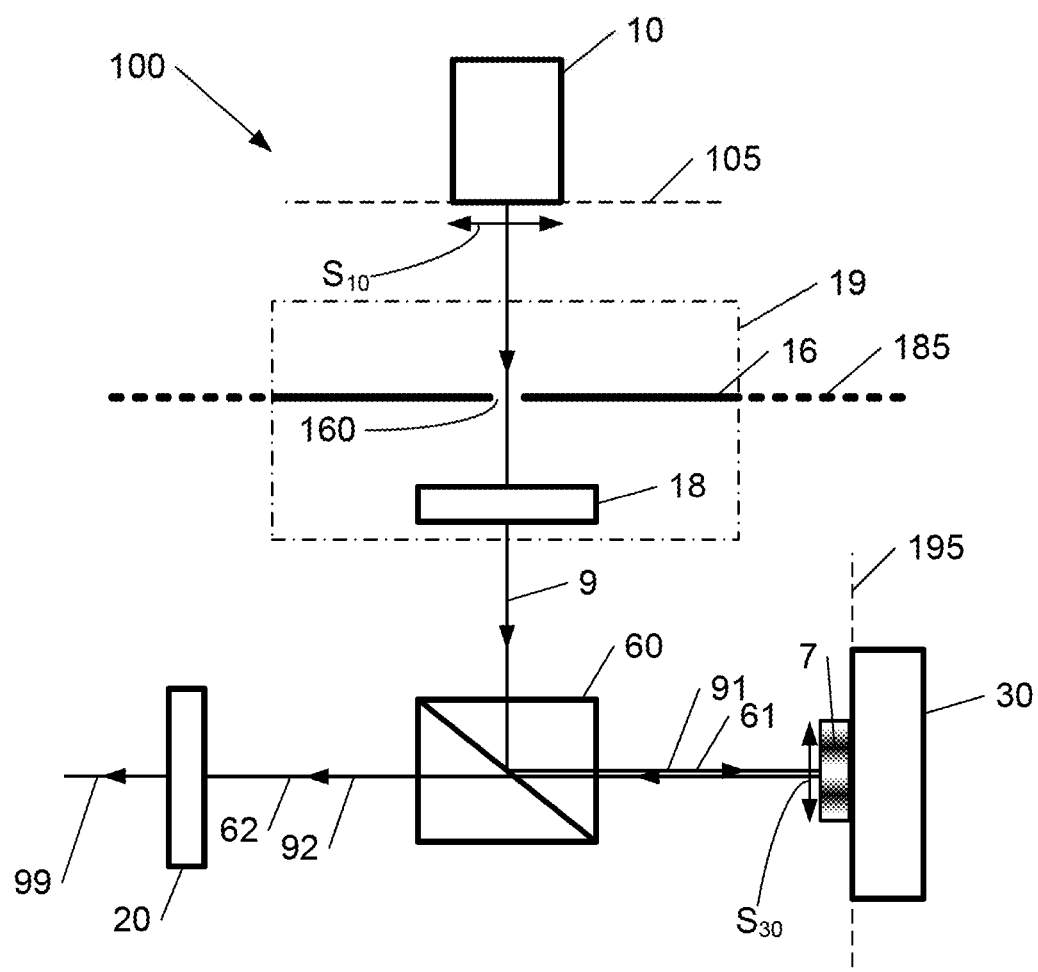
FIGS. 2a, 2b, 3a, 3b, 4a, 4b show embodiments of a projection device of the measuring system of the invention.

FIG. 2a shows a projection device 100 according to an embodiment of the invention. This projection device 100 comprises a spatially limited light source 10 along a light source surface $S_{10}$. The source 10 is configured to emit a light beam in the source plane 105. According to a preferred embodiment, the source 10 is configured to emit a spatially limited light beam in the source plane 105. The projection device 100 comprises an illumination module 19 comprising a first selection means 16 having a first aperture 160 and a first converging optical element 18. According to a preferred embodiment, the first aperture 160 is positioned in the object focal plane 185 of the first converging optical element 18. The first aperture 160 and the first converging optical element are positioned so as to collect a spatially limited portion of the light beam. The spatially limited light beam after its passage through the first aperture 160 and the first converging optical element 18 is the illumination beam 9 which is directed towards a beam splitting means 60 for further direct it towards a matrix optical modulation means 30 in reflection with a direction normal to the surface of the matrix optical modulation means 30. The matrix optical modulation means 30 have an illuminated optical modulation surface $S_{30}$, at least partly, by the illumination beam 9 resulting from the passage of the light beam resulting from the source 10 in the illumination module 19. The illumination beam 9 becomes the first light beam 91 along a first optical path 61 after its passage through the splitting means 60 and is reflected into a second light beam 92 by the matrix optical modulation means 30 in reflection along a direction normal thereto along a second optical path 62. The beam splitting means 60 allows at least a portion of the light beam reflected by the matrix optical modulation means 30 to be transmitted to a Schlieren lens 20. The beam reflected by the matrix optical modulation means 30 has a pattern 7 which then illuminates the Schlieren lens 20. The Schlieren lens 20, allows an inspection light beam 99 to be projected onto an optical element to be measured 2, the angle of incidence of which varies according to an offset of the pattern 7 as it illuminates the Schlieren lens 20.

Figure 2B:
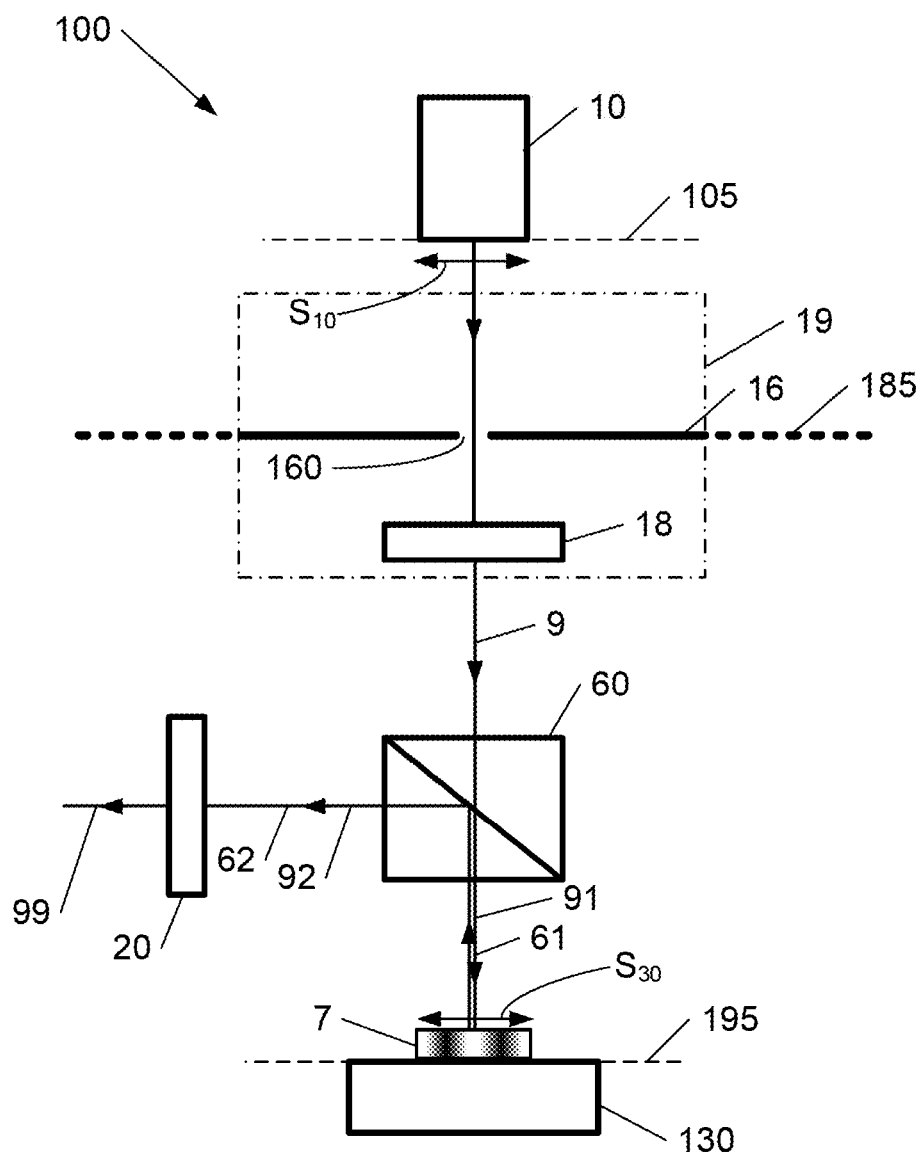

FIG. 2b is an embodiment close to that of FIG. 2a. It differs, however, in that the matrix optical modulation means 30 are positioned such that when the first light beam 91 along a first optical path 61 is reflected into a second light beam 92 by the matrix optical modulation means 30 in reflection along a direction normal thereto along a second optical path 62, the light beam splitting means 60 are configured to transmit at least a portion of the first light beam 91 and to reflect at least a portion of the second light beam 92. The beam splitting means 60 allows at least a portion of the light beam reflected 92 by the matrix optical modulation means 30 to be reflected to a Schlieren lens 20. The illumination beam 9 becomes the first light beam 91 along a first optical path 61 after its transmission through the splitting means 60.

The matrix optical modulation means 30 in reflection are configured to reflect the image of the light source 10 with a pattern 7 which after passing through the Schlieren lens 20 allows to provide an inspection beam for a deflectometry measuring system 200. According to a preferred embodiment, the source 10 is configured to emit a spatially limited light beam in the source plane 105. The pattern 7 thus formed by the projection device of the invention 100 is created by the point-by-point (pixel-by-pixel) activation or non-activation of the matrix optical modulation means 30 in reflection. The activation of the matrix optical modulation means 30 in reflection, allows for example a spatial deviation, a change in phase, a change in a reflection factor etc. The modulation can thus be carried out in intensity or in phase to illuminate the Schlieren lens 20 with the pattern 7. The phase modulation requires a polarizing optical element to convert the phase modulation into an intensity modulation, which is required in the case of the application of the projection device 100 for a measurement by deflectometry. A polarizing optical element is for example a polarizer. The phase modulation results in a modulation of the polarization of the light, which is analyzed by the polarizer.

Figure 3A:
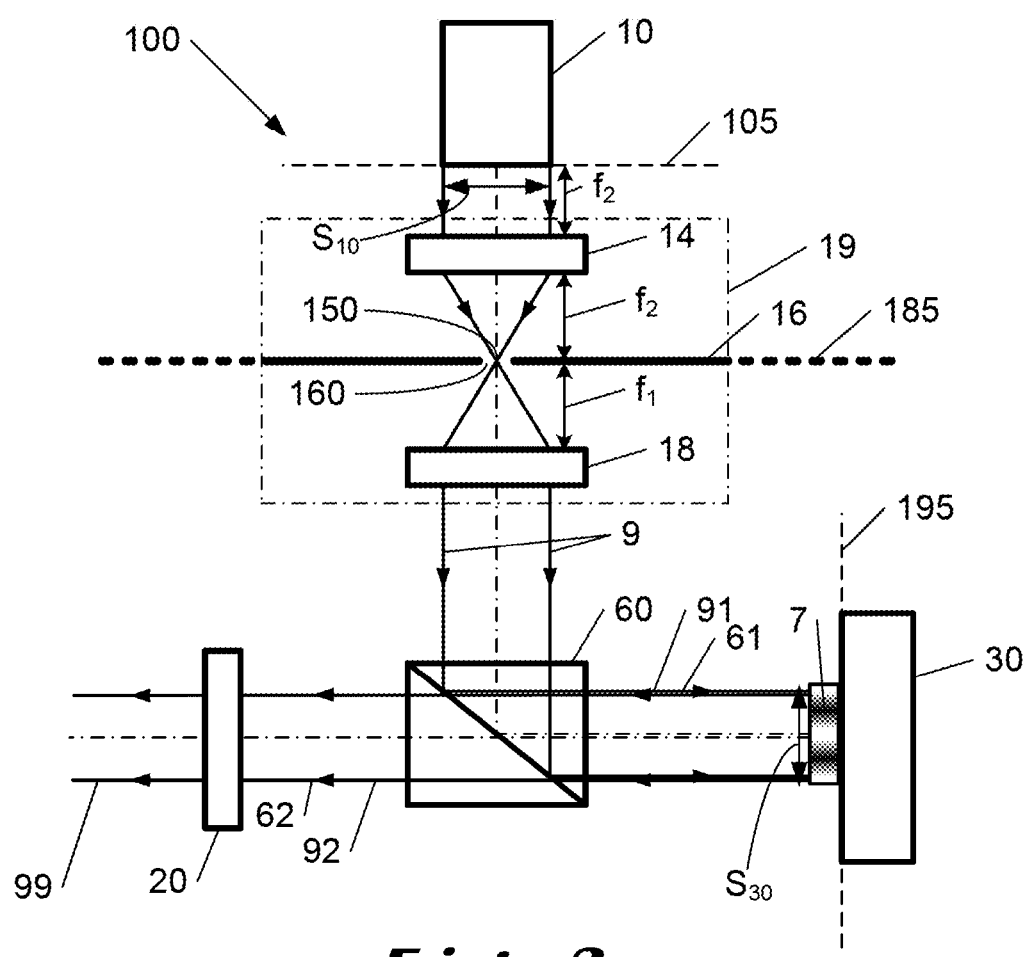

FIG. 3a shows another embodiment of the projection device 100 of the invention. The projection device 100 comprises a spatially limited light source 100 along an emission surface $S_{10}$. The projection device 100 comprises an illumination module 19, which is an imaging system 4F, for forming an image of the spatially limited light source 10 in the source plane 105 on the matrix optical modulation means 30. The illumination module 19 comprises a first 18 and a second 14 converging optical elements, such as converging thin lenses or pairs of converging thin lenses. The first 18 and second 14 converging optical elements are positioned so that the image focal plane of the second optical element 14 coincides with the object focal plane of the first optical element 18. Thus, according to a preferred embodiment, by means of the illumination module 19, an image of the light source 10 is obtained on the matrix optical modulation means 30 in reflection. The projection device further comprises a first selection optical element 16 having a first aperture 160. This first aperture 160 is positioned so as to surround a convergence point 150 corresponding to the coincidence of the image focus of the second converging optical element 14 and the object focus of the first converging optical element 18. Thus, the first aperture 160 allows to control the maximum angular aperture (maximum angular distribution) (at the level of the matrix optical modulation means and not at the level of the object to be tested) of the light beam generated by the source 10 that exhibits an excessive divergence/convergence. Indeed, the light beam resulting from the source 10 is focused and only the light beams entering parallel to the optical axis of the second convergent optical element 14 pass through its image focus located on the optical axis A. The second aperture 160 therefore allows to limit the passage of the components of the light beam passing through the first converging optical element 18. Thus, it is possible to obtain a collimated illumination beam 9 whose components propagate substantially parallel to the optical axis A. The first aperture 160 is formed in the first selection optical element 16. The first aperture 160 may have a circular, elliptical or rectangular cross-sectional area, for example. The cross-sectional area of the first aperture 160 preferably has a surface area of less than 10 mm², more preferably less than 5 mm² and even more preferably less than 2 mm².

The first converging optical element 18 has a focal length $f_1$. The second converging optical element 14 has a focal length $f_2$.

In FIG. 3a, the device 100 comprises beam splitting means 60 which allow the optical modulation means 30 to be illuminated at a selected angle. Here, the beam splitting means 60 allows to illuminate the optical modulation means 30 with the illumination beam 9 (preferably collimated) which becomes the first light beam 91 along a first optical path 61 describing an angle of 90° with respect to the matrix phase modulation means 30. A portion of the illumination beam 9 (collimated) is transmitted through the beam splitting means 60 (not shown) and a portion is reflected to the optical modulation means 30. In a preferred embodiment, a polarizer is positioned between the source 10 and the beam splitting means 60 so as to block the portion of the illumination beam 9 that would be transmitted through the splitting means 60. Thus, the beam splitting means 60 are configured so as to obtain from said illumination beam 9 (collimated), a first light beam 91 deflected by the beam splitter 60 along a first optical path 61 directed towards said matrix optical modulation means 30. The first light beam is reflected onto the matrix optical modulation means 30 into a second light beam 92. The second light beam 92 is directed towards the beam splitter 60 where it is transmitted at least partly by said beam splitter 60 along a second optical path 62.

In FIG. 3a, in the case of beam splitting means 60 which is a polarizing cube, the illumination beam 9 which becomes the first light beam 91 when deflected by the cube corresponds to a (collimated) beam polarization. The reflection of the first light beam 91 onto the matrix phase modulation means 30 allows the polarization of portions of the second light beam 92 to be selectively modified. Preferably, the matrix phase modulation means 30 allow the polarization to be selectively modified with a 90° phase shift relative to the polarization of the first light beam 91. Thus, the portions of the second light beam 92 having undergone a 90° phase shift are transmitted by the cube 60 while the portions of the second light beam 92 having not undergone a phase shift are reflected by the cube 60 (towards the source). In this way, a pattern 7 can illuminate the Schlieren lens and be projected by the projection device 100 onto the optical element to be measured 2 with an angle-intensity encoding for a measurement by deflectometry. According to a particular embodiment, it is possible to have a non-binary image by playing on the fraction of time during which the polarization is modified.

Figure 3B:
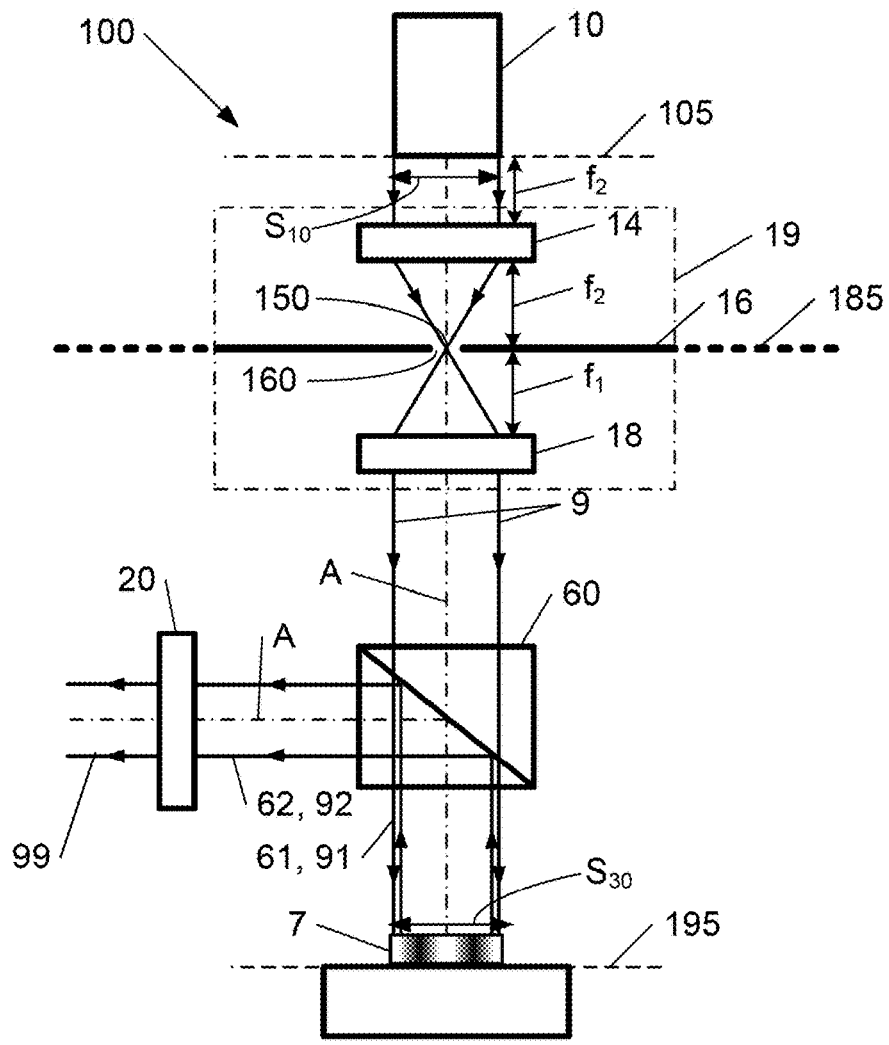

FIG. 3b shows a variant of FIG. 3a where the phase modulation means are positioned so as to be illuminated by the portion of the (collimated) beam that is transmitted by the cube 60 rather than the portion of the (collimated) beam that is reflected/deflected by the cube 60 (as in FIG. 3a). Thus, the phase modulation means allow to induce a 90° phase shift to the illumination beam 9 which becomes the first light beam 91 in a selective manner so as to form a pattern 7. Thus, the portions of the second light beam 92 having undergone this 90° phase shift are reflected by the cube 60 while the portions (not shown) having not undergone a phase shift are transmitted by the cube 60. The pattern 7 projected onto the Schlieren lens 20 by the second light beam 92 after its passage through the cube 60 (reflection) can therefore be used for a measurement by deflectometry.

Figure 3C:
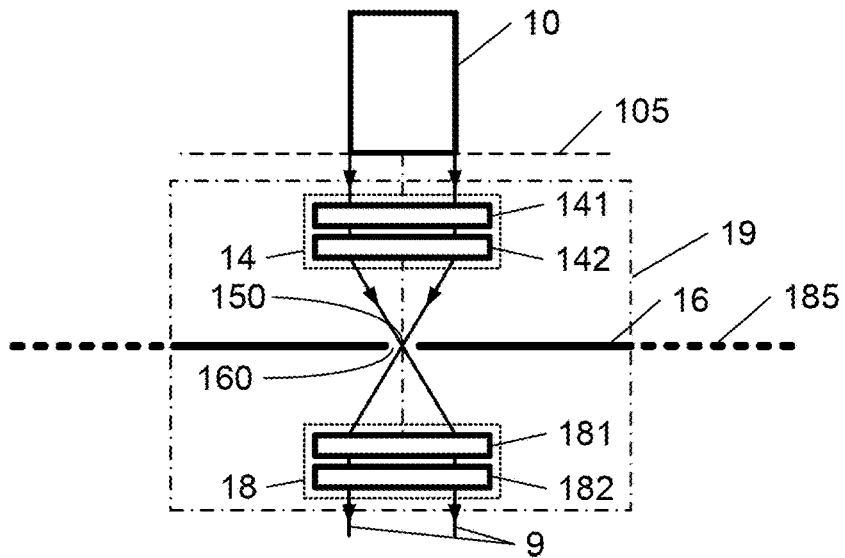
FIG. 3c shows an embodiment of the source and the illumination module.

FIG. 3c shows an embodiment of the illumination module according to FIGS. 3a, 3b, 4a and 4b. In this embodiment, the first 18 and second 14 converging optical elements each comprise a pair of converging lenses. This embodiment allows commercially available lens pairs to be used to achieve shorter focal lengths. For example, the lens pairs 141, 142; 181, 182 comprise two lenses 141, 142; 181, 182 of focal length 50 mm, which allow to provide first 18 and second 14 converging optical elements of focal length 25 mm. The lenses 141, 142; 181, 182 of each pair being for example 1 mm apart.

Figure 4A:
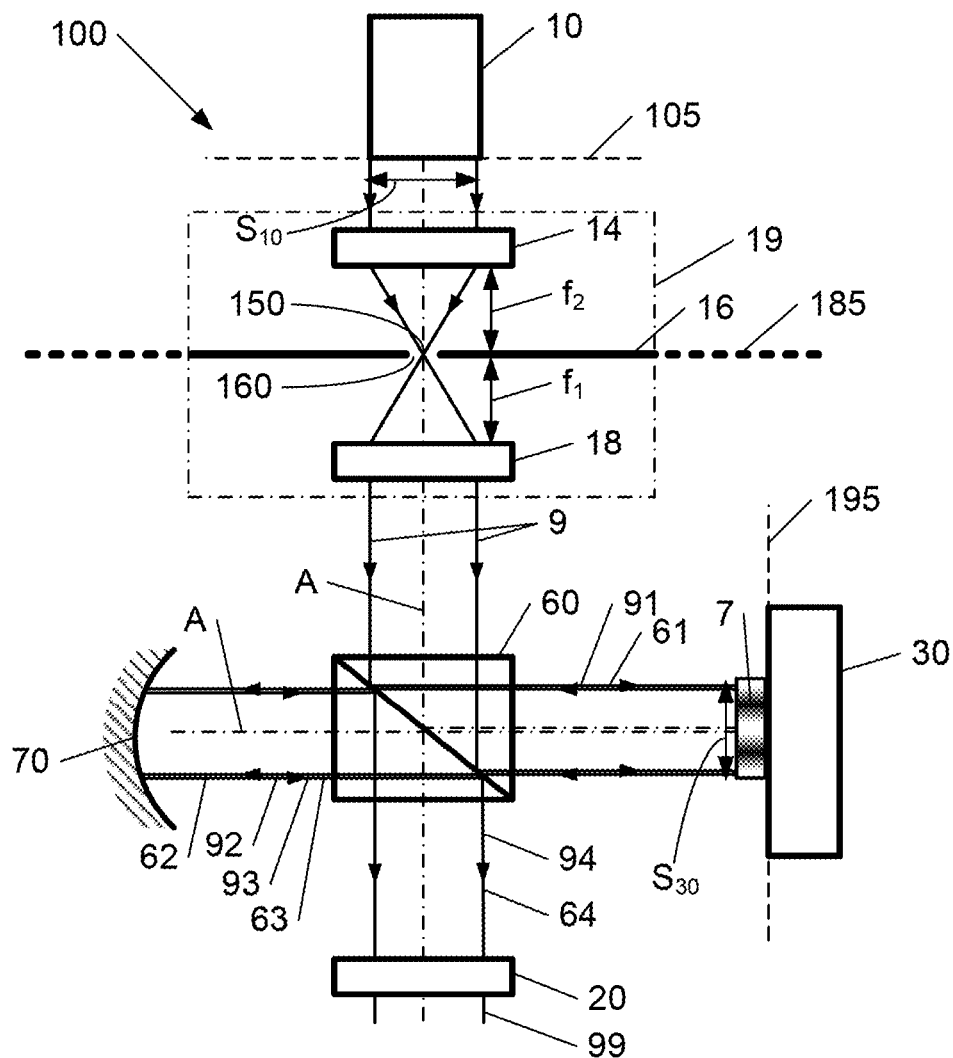

FIG. 4a shows the projection device of FIG. 3a further comprising a non-planar mirror 70 allowing to reflect the second light beam 92 to the cube 60, into a third light beam 93 along a third optical path 63. According to a preferred embodiment, a polarizer (not shown) is positioned between the first converging optical element 18 and the beam splitting means 60 so that all the intensity of the illumination light beam 9 directed towards the beam splitting means 60 is reflected to the matrix optical modulation means 30. The third light beam 93 is then reflected by the cube 60 into a fourth light beam 94 along a fourth optical path towards an optical element to be measured 2. A quarter-wave plate is positioned between the non-planar mirror 70 and the cube 60, so that the second beam 92 which is transmitted by the cube 60 and then reflected by the non-planar mirror 70 into a third beam 93 is reflected by the cube 60 into a fourth beam 94. Indeed, the passage of the second and then of the third beam 92, 93 through the quarter-wave plate allows to generate a 90° phase shift in the light beam so that its direction is deviated when it passes back into the cube 60 (with negligible losses in intensity). The pattern 7 generated by this embodiment is then directed towards the Schlieren lens 20 and projected by the projection device 100 onto the optical element to be measured 2 with an angle-intensity encoding for a measurement by deflectometry. Due to the reflection on the non-planar mirror, this embodiment allows large angles to be generated during the angle-intensity encoding by the Schlieren lens 20, which allows the measurement of optical elements to be measured 2 with small radii of curvature.

The device of FIG. 4a comprising the non-planar mirror 70 and a quarter-wave plate can be configured from the device 100 described in FIG. 3b, by changing the position of the elements relative to the cube 60. The advantage of being able to modify the position of the elements around the cube 60 allows to make the device adaptable to different applications requiring various cluttering.

Figure 4B:
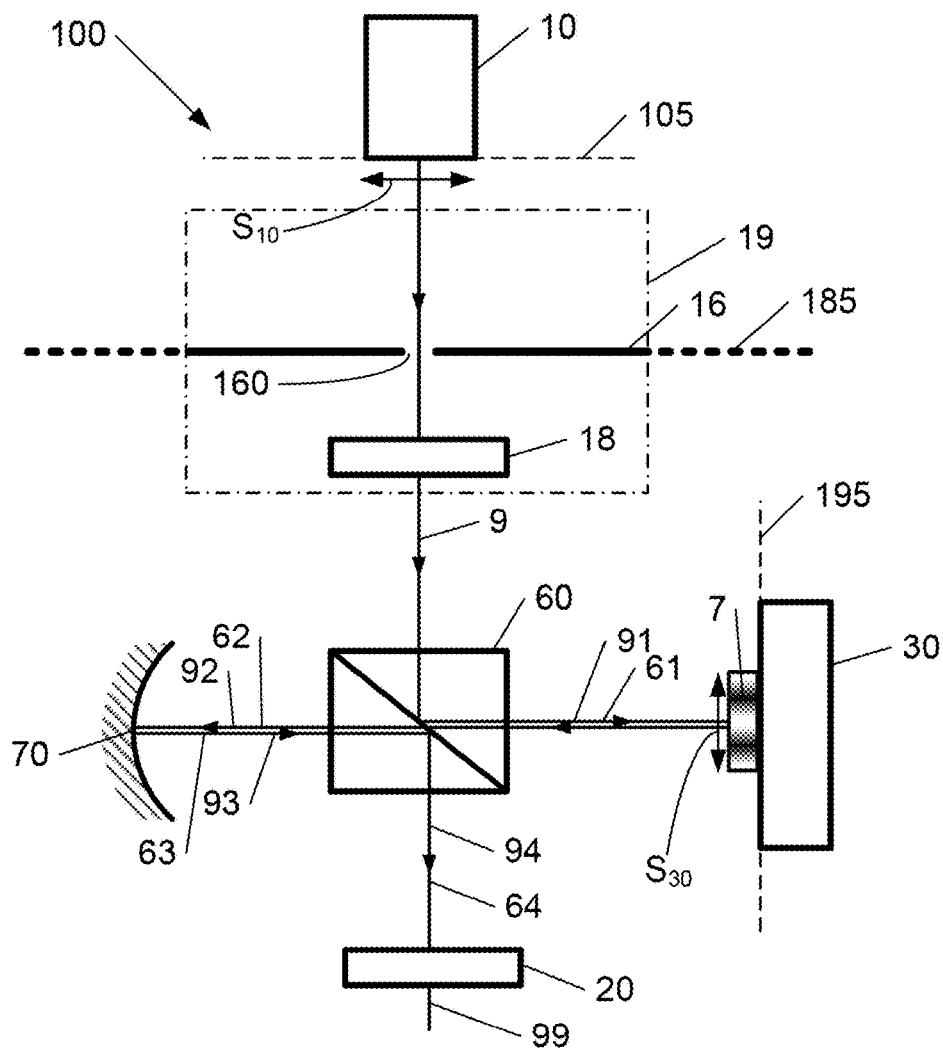

The device in FIG. 4b shows a combination of FIG. 4a with the imaging module 19 of FIG. 2a.

Figure 5:
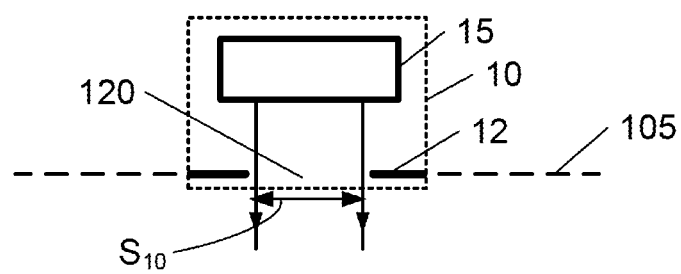
FIG. 5 shows an embodiment of the source.

FIG. 5 shows a spatially limited light source 10 comprising a light source 15 and a second selection optical element 12 having a second aperture 120. The second aperture 120 is formed in the second selection optical element 12. For example, the second aperture 120 has a rectangular, square, elliptical or circular cross-sectional area. The second aperture 120 has a second aperture surface area $S_{120}$ that corresponds to the surface area of the recessed portion of the second selection optical element 12. The light beam resulting from the light source 15 is therefore spatially limited by the second selection optical element 12, so as to obtain a spatially limited light beam adapted to illuminate a surface according to a rectangle, an ellipse or a circle. For example, $S_{10}$ is greater than $S_{120}$. The second selection optical element is positioned in a source plane 105. The use of the source 10 of FIG. 5 in a projection device of FIGS. 2a, 2b, 3a, 3b, 3c, 4 allows, thanks to the positioning of the first 16 and second 12 selection optical elements with respect to the illumination module 19, to obtain a well controlled illumination of the optical modulation means 30, that is to say an illumination with a light beam whose sizes do not exceed the sizes of the active portion of the matrix optical modulation means 30 in reflection or of the useful area for defining the maximum desired angular distribution. The active portion of the matrix optical modulation means 30 in reflection is, for example, a liquid crystal matrix on a semiconductor substrate. In addition to the spatial control of the beam illuminating the matrix optical modulation means 30 in reflection, the first aperture 160 allows to control the angles of incidence of the beam on the matrix optical modulation means 30 in reflection and thus the angles after reflection.

Figure 6:
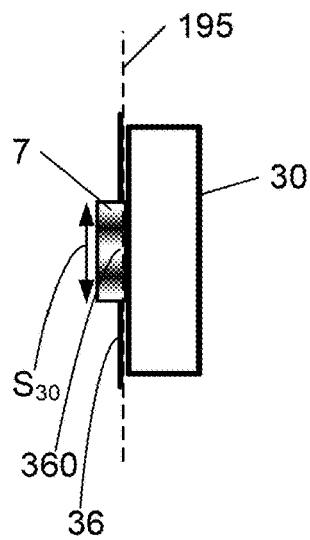
FIG. 6 shows an embodiment of the matrix optical modulation means.

FIG. 6 shows an embodiment of the matrix optical modulation means 30 comprising third selection means 36 having a third aperture 360. The third aperture 360 is positioned in the plane 195 of the matrix optical modulation means 30, so as to spatially limit the light beam reflected by the matrix optical modulation means 30. The matrix optical modulation means 30 of FIG. 6 may be adapted to any embodiment of the measuring system 200 of the present invention.

FIGS. 7, 8a, 8b and 9 illustrate several embodiments of the deflectometry measuring system 200 according to the invention.

Figure 7:
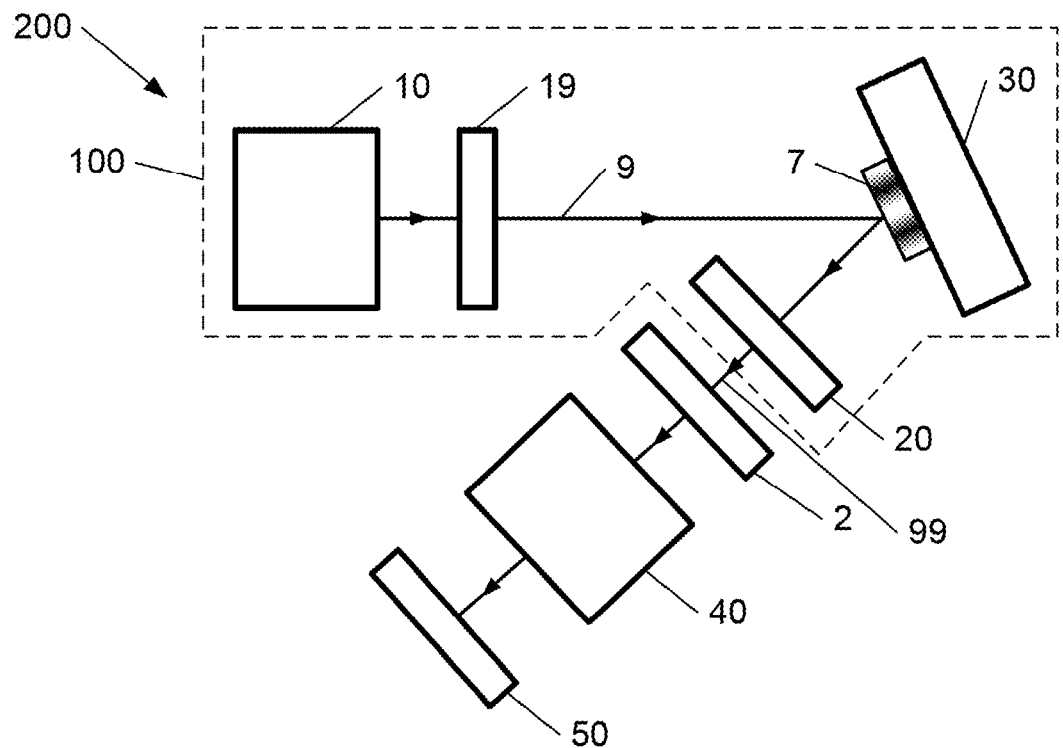
FIGS. 7, 8a, 8b, 9, 10a and 10b show embodiments of the measuring system of the invention.

FIG. 7 illustrates an embodiment of the deflectometry measuring system 200 of the invention. The measuring system 200 comprises the projection device 100, which allows to project the pattern 7 after it passes through the Schlieren lens 20 towards the optical element to be measured 2. Then, an image of the element 2 to be measured is formed on the matrix detection means 50 by the imaging means 40. The matrix optical modulation means and the matrix imaging means are synchronized so that an image is acquired for each pattern projection 7. For each successively acquired image, the pattern 7 is shifted in phase on the Schlieren lens 20 with respect to the preceding image, so as to obtain a variation of the angles of the pattern 7 on the optical element to be measured 2. The illumination module 19 corresponds to one of the illumination modules 19 shown and described in FIGS. 2a, 2b, 3a, 3b, 3c, mutatis mutandis.

The measurement rate of an optical element 2 to be measured is in part defined by the speed of the optical modulation means 30. A possible option to achieve higher speeds is to display a binary pattern 7 instead of a sinusoidal pattern 7. Indeed, the binary pattern 7 will be transformed into a sinusoidal-like pattern 7 after convolution with the response of the blocking element 45. It should be noted that this conversion is never perfect. Also, the gain in speed translates into a loss in optical performance in general and in angular resolution in particular. It is also possible to generate a non-binary image on the matrix detection means 50 with a binary pattern 7 by adjusting the time during which the pattern 7 is displayed by the matrix optical modulation means 30. This is possible provided that said time is shorter than the integration time used by the matrix detection means 50 and that the matrix detection means 50 and the matrix optical modulation means 30 are synchronized. In the absence of sample to be measured 2 in the system 200, the second focusing plane 405 is conjugate to the image plane (or modulation plane) 195 with possible positioning tolerances.

Figure 8A:
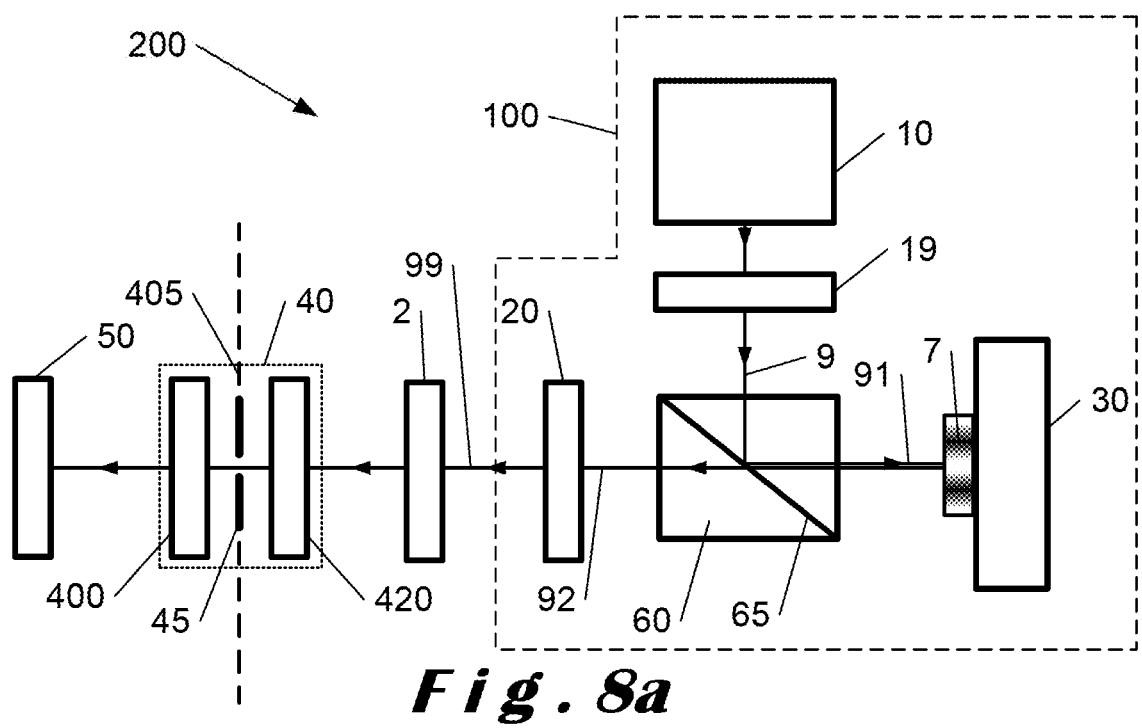

FIG. 8*a* shows an embodiment of the measuring system 200 comprising, in addition to the embodiment of FIG. 7, a polarizing beam splitter cube 60 positioned between the Schlieren lens 20 and the phase modulation means 30, such that the components of the second light beam 92 that have undergone a phase modulation during the reflection of the first light beam 91 on the phase modulation means 30 are transmitted by the cube 60 along the second optical path 62. It is possible to implement the embodiment of the projection device 100 of FIG. 3*b* in which, the beam splitter cube 60 is positioned between the illumination module 19 and the phase modulation means 30, such that the components of the second light beam 92 having undergone a phase modulation during the reflection of the first light beam 91 on the phase modulation means 30 are reflected by the cube 60 along the second optical path 62.

Figure 8B:
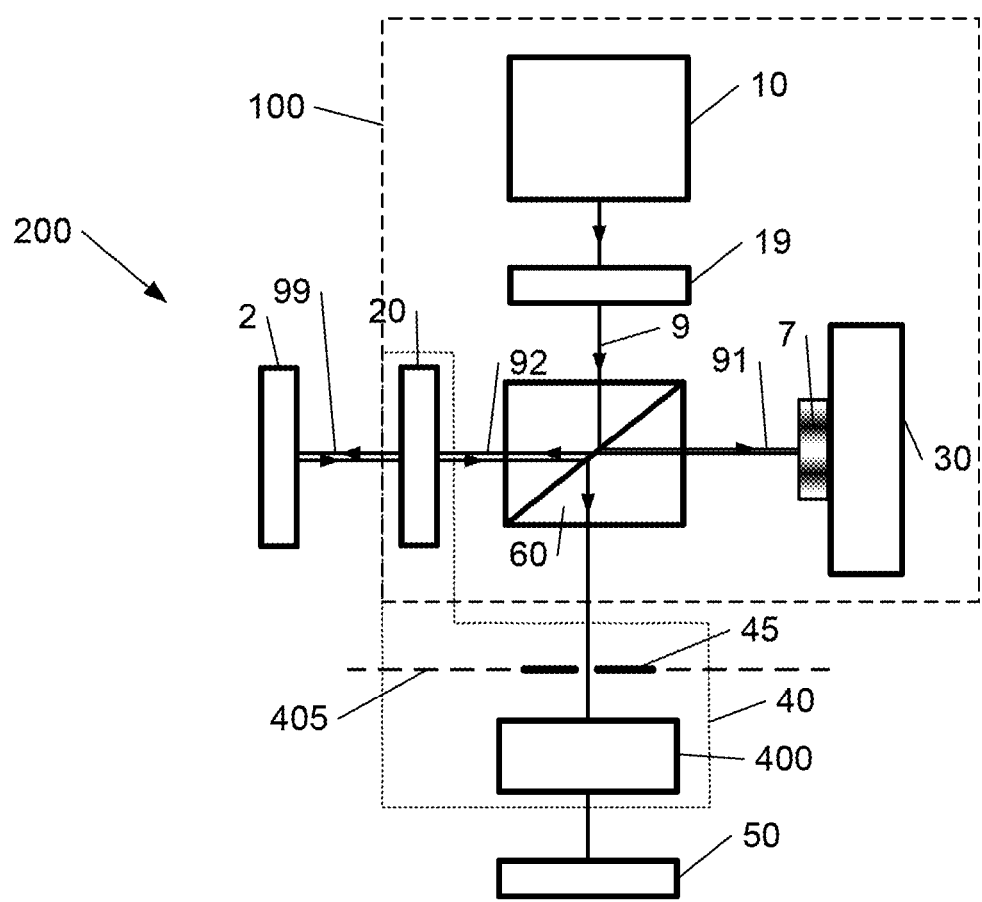

FIG. 8*b* shows an embodiment of the measuring system 200 for the measurement of optical elements 2 in reflection. The measuring system 200 comprises the projection device 100 configured to project the pattern 7 onto the optical element 2 to be measured. The projection device 100 comprises the splitter cube 60 allowing to form the pattern 7 from the reflected beam on the matrix phase modulation means 30. The pattern 7 is projected through the Schlieren lens 20 to the optical element 2 to be measured, where it is reflected back through the Schlieren lens 20 to the cube 60. The pattern 7 is then directed by the cube 60 towards the matrix detection means 50. An image of the optical element to be measured in reflection 2 is then formed on the matrix detection means 50 by the imaging means 40 using the Schlieren lens 20 in combination with a second imaging optical element 400. A quarter-wave plate not shown positioned between the optical element 2 and the polarizing cube 60 allows the reflection by the cube 60 of the light beam reflected by the optical element 2. This embodiment is particularly compact because it uses the same polarizing cube 60 for the formation of the pattern 7 in combination with the phase modulation means 60 in reflection by playing the role of an analyzer and then allowing to carry out a measurement of an element 2 in reflection by allowing with a quarter-wave plate, a measurement with a light beam perpendicular to the optical axis of the element to be measured 2.

Figure 9:
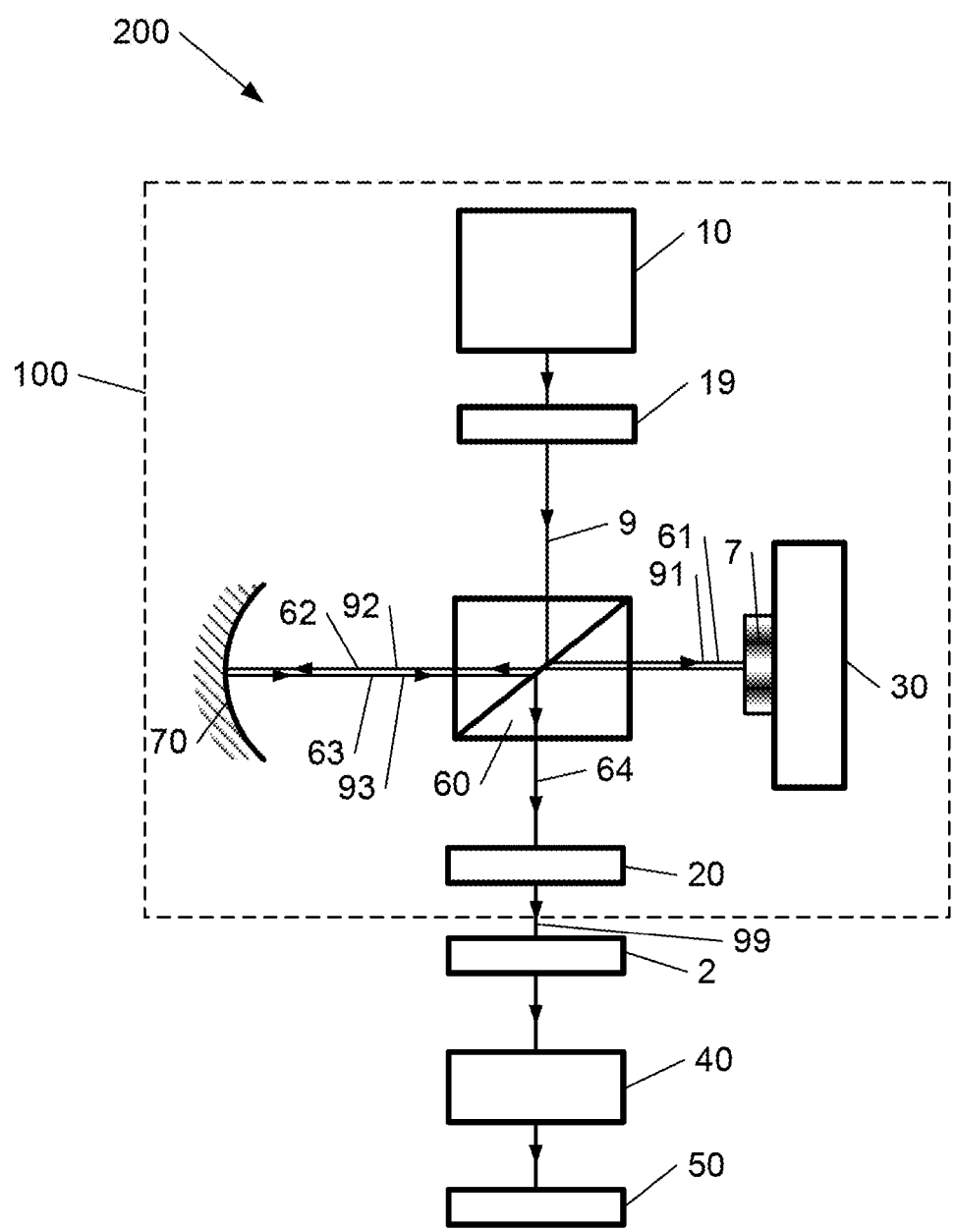

FIG. 9 shows an embodiment of the measuring system 200 comprising the projection device 100 of FIG. 4*a* or 4*b*. Preferably, a polarizer (not shown) is positioned between the illumination module 19 and the beam splitting means 60 to prevent all the light of the illumination beam from being directly transmitted by the light beam splitting means 60. The fourth light beam 94 defining the pattern 7 passes through the Schlieren lens 20 to encode the angle of the inspection beam 99 according to the intensity of the pattern. The inspection beam is preferably projected by the projection device 100 along the fourth optical path 64 the optical element to be measured 2. An image of the optical element to be measured is formed on the matrix detection means 50 by the imaging means 40. This embodiment is particularly well adapted to measurements of optical elements 2 having a high optical power, for example greater than 20 D and even more adapted to optical powers greater than 25 D. Optical elements 2 having a high optical power are for example intraocular lenses.

Figure 10A:
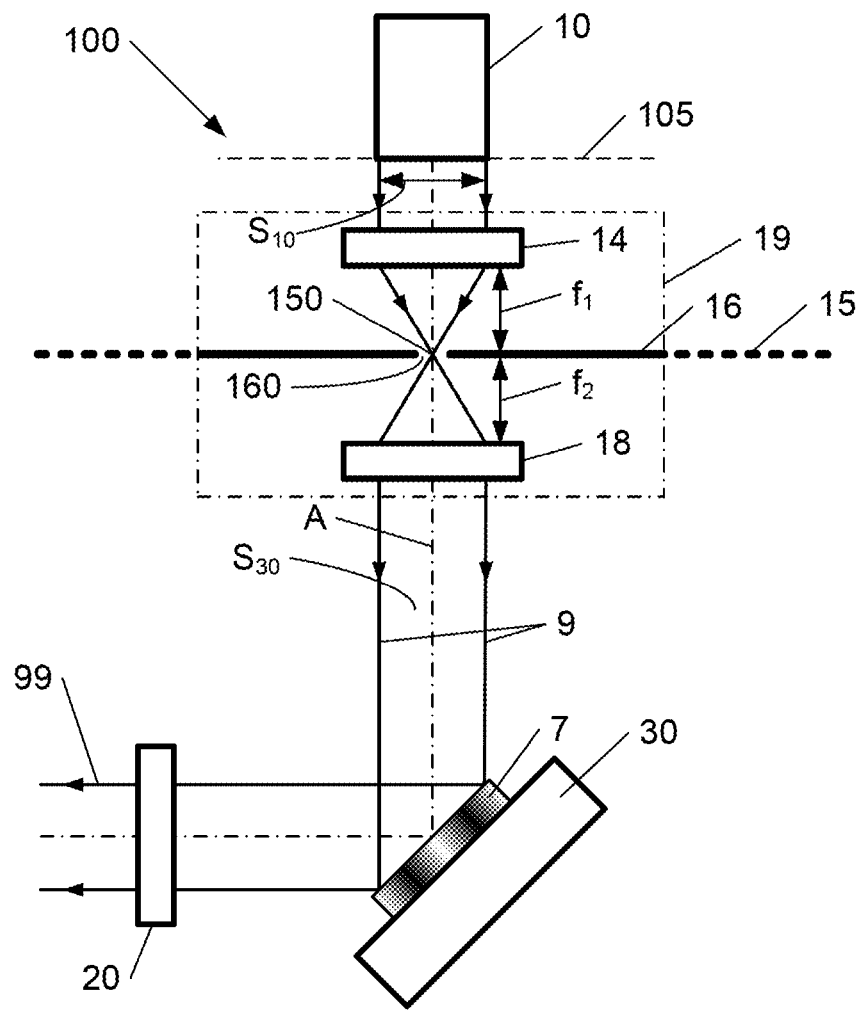

FIG. 10*a* shows an example of the projection device 100 similar to that of FIGS. 3*a* and 3*b* but not requiring beam splitting means.

Figure 10B:
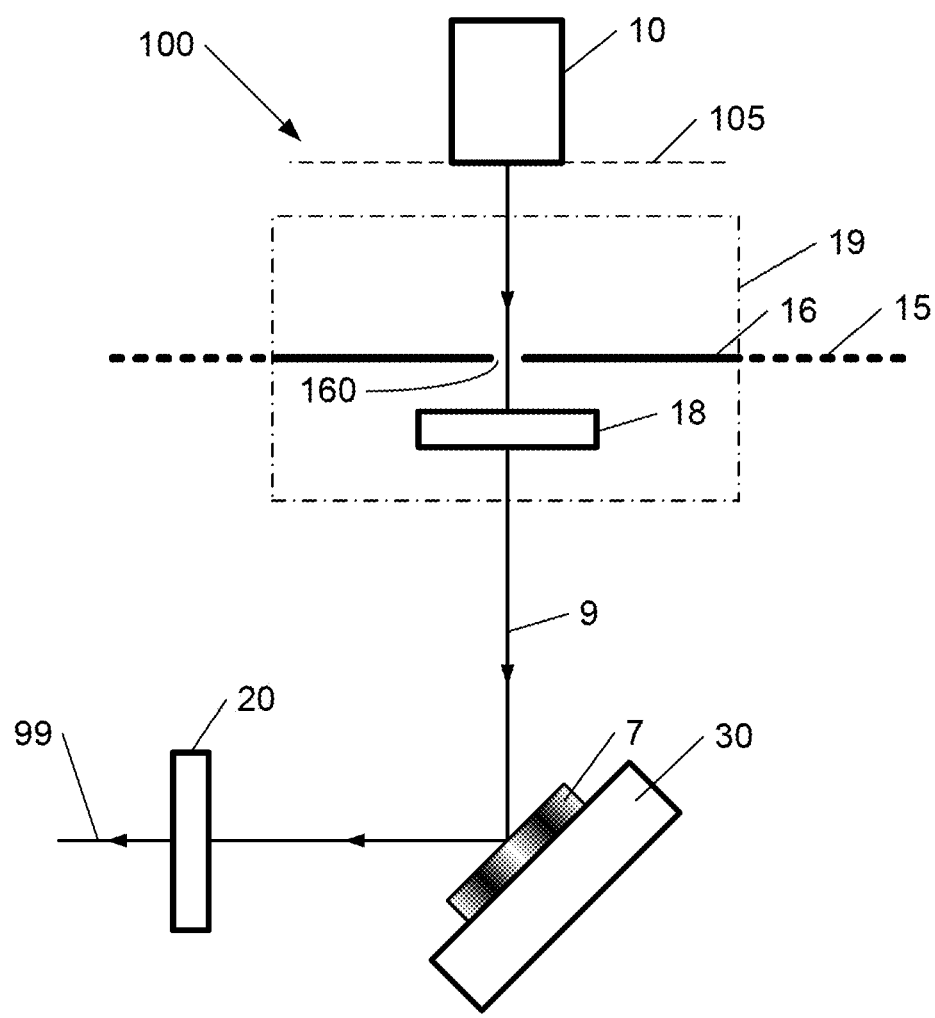

FIG. 10*b* shows an example of the projection device 100 similar to that of FIGS. 2*a* and 2*b* but not requiring beam splitting means. The projection devices 100 of FIGS. 10*a* and 10*b* can be used in the embodiments of the deflectometry measuring systems of FIGS. 7, 8*a*, 8*b*, 9, and in particular with that of FIG. 7.

The present invention has been described above in connection with specific embodiments, which are illustrative and should not be considered limiting. In general, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

In summary, the invention can also be described as follows. A system for measuring 200 a sample 2 by deflectometry, comprising:
 a source 10 for generating a spatially limited light beam in a source plane 105;
 an imaging module 19 comprising:
  a first converging optical element 18;
  a first selection optical element 16 having a first aperture 160, said first selection optical element 16 being positioned in an object focal plane 185 of said first converging optical element 18;
 matrix optical modulation means 30 in reflection positioned in an image plane of the imaging module 19 which is conjugate to said source plane 105, to form a pattern 7;
 a Schlieren lens 20;
said measuring system 200 being configured such that said pattern 7 is adapted to illuminate said Schlieren lens 20 so as to obtain an angle-intensity encoding of said pattern 7 into an inspection light beam 99;
 imaging means 40 for forming an image of said sample 2 after interaction of said inspection light beam 99 with said sample 2;
 matrix detection means 50 for detecting said image of said sample 2 formed by said imaging means 40.

In summary, the invention can also be described as follows.

A system for measuring 200 a sample 2 by deflectometry, comprising:
 a source 10 for generating a light beam in a source plane 105;

an illumination module 19 for forming an illumination beam (9) comprising:
a first converging optical element 18;
a first selection optical element 16 with a first aperture 160;
matrix optical modulation means 30 in reflection, to form a pattern 7, said first aperture 160 being configured to control the angles of said illumination beam 9 on said matrix optical modulation means 30 in reflection;
a Schlieren lens 20 to obtain an angle-intensity encoding of said pattern 7 on the sample 2;
imaging means 40 and detecting means 50 for detecting an image of said sample 2.

The invention claimed is:

1. A system for measuring a sample by deflectometry comprising:
a source for generating a light beam in a source plane;
an illumination module comprising:
a first converging optical element;
a first selection optical element having a first aperture, said first selection optical element being positioned between said source plane and said first converging optical element;
said illumination module being configured to generate an illumination beam from said light beam of said source;
matrix optical modulation means in reflection, for forming a pattern from said illumination beam;
said first aperture being configured to control angles of incidence of said illumination beam on said matrix optical modulation means in reflection;
a Schlieren lens;
said measuring system being configured such that said pattern is adapted to illuminate said Schlieren lens so as to obtain an angle-intensity encoding of said pattern into an inspection light beam;
imaging means for forming an image of said sample after interaction of said inspection light beam with said sample said Schlieren lens being positioned between said matrix optical modulation means and said imaging means along an optical path of a light beam generated by said source when the latter is activated;
matrix detection means for detecting said image of said sample formed by said imaging means;
said system further comprising:
beam splitting means configured to obtain from said illumination beam resulting from the illumination module:
a first light beam transmitted by said beam splitter along a first optical path directed towards said matrix optical modulation means;
a second light beam deflected by said beam splitter along a second optical path resulting from a reflection of said first light beam transmitted by said matrix optical modulation means,
said first and second optical paths being perpendicular;
a non-planar mirror positioned so as to reflect said second light beam, resulting from a reflection on said matrix phase modulation means, into a third light beam reflected to said beam splitter along a third optical path.

2. The measuring system according to claim 1 wherein said matrix optical modulation means are positioned in a modulation plane optically conjugate to said source plane, said illumination beam being spatially limited at the level of said matrix optical modulation means in reflection by at least one of the following means:
a second selection optical element having a second aperture, positioned in said source plane;
a third selection optical element having a third aperture, positioned in said modulation plane;
a source comprising a spatially limited light source.

3. The measuring system according to claim 1 wherein said first selection optical element is positioned in an object focal plane of said first converging optical element.

4. The measuring system according to claim 1 wherein it further comprises:
a third selection optical element having a third aperture, said third selection optical element being positioned at the level of said matrix optical modulation means.

5. The measuring system according to claim 1 wherein:
said illumination module is an illumination module 4F comprising:
a second converging optical element positioned between said source and said first selection optical element, and configured such that:
its object focal plane coincides with said source plane;
its image focal plane coincides with said object focal plane of said first converging optical element positioned between said first and second converging optical elements,
said image plane of the illumination module coincides with the image focal plane of the first converging optical element.

6. The measuring system according to claim 1 wherein said matrix optical modulation means are matrix phase modulation means, optionally comprising a liquid crystal on silicon matrix.

7. The measuring system according to claim 1 wherein it further comprises:
beam splitting means configured to obtain from said illumination beam resulting from said illumination module:
a first light beam deflected by said beam splitter along a first optical path directed towards said matrix optical modulation means;
a second light beam transmitted by said beam splitter along a second optical path resulting from a reflection of said first light beam deflected by said matrix optical modulation means,
said first and second optical paths being parallel.

8. The measuring system according to claim 1 wherein it further comprises:
beam splitting means configured to obtain from said illumination beam resulting from the illumination module:
a first light beam transmitted by said beam splitter along a first optical path directed towards said matrix optical modulation means;
a second light beam deflected by said beam splitter along a second optical path resulting from a reflection of said first light beam transmitted by said matrix optical modulation means,
said first and second optical paths being perpendicular.

9. The measuring system according to claim 1 wherein:
said matrix optical modulation means are matrix phase modulation means, comprising a liquid crystal on silicon matrix;
it further comprises:
beam splitting means configured to obtain from said illumination beam directed along an optical axis A and resulting from the illumination module:
a first light beam deflected by said beam splitter along a first optical path directed towards said matrix optical modulation means;

a second light beam transmitted by said beam splitter along a second optical path resulting from a reflection of said first light beam deflected by said matrix optical modulation means, said first and second optical paths being parallel;

said beam splitting means comprising a polarizing beam splitter;

said polarizing beam splitter being configured such that the optical axis A is perpendicular to said second optical path.

10. The measuring system according to claim 1 wherein said source comprises a light source and a second selection means having a second aperture for spatially limiting a light beam resulting from said light source, said second selection means being positioned in said source plane.

11. The measuring system according to claim 1 wherein said source comprises a spatially limited light source.

12. The measuring system according to claim 1 wherein:
said illumination module is an illumination module 4F comprising:
a second converging optical element positioned between said source and said first selection optical element, and configured such that:
its object focal plane coincides with said source plane;
its image focal plane coincides with said object focal plane of said first converging optical element positioned between said first and second converging optical elements,
said image plane of the illumination module coincides with the image focal plane of the first converging optical element,
said light beam is spatially limited according to a spatially limited light beam surface area $S_{10}$, and,
said matrix optical modulation means have an optical modulation surface area $S_{30}$ such that:

$$\frac{S_{30}}{S_{10}} = \gamma,$$

where $\gamma$ is the magnification factor of the illumination module, so that:

$$\gamma = \frac{f_1}{f_2},$$

where $f_i$ corresponds to the focal length of the first converging optical element and $f_2$ corresponds to the focal length of the second converging optical element.

13. The measuring system according to claim 1 wherein said first aperture has a first aperture surface area of less than 50 mm$^2$.

14. The measuring system according to claim 9 wherein said first aperture is centered on said optical axis A.

15. The measuring system according to claim 1 wherein:
said first aperture has a first aperture surface area of less than 50 mm$^2$;
it further comprises polarizing beam splitting means configured to obtain from said illumination beam resulting from the illumination module:
a first light beam transmitted by said beam splitter along a first optical path directed towards said matrix optical modulation means;
a second light beam deflected by said beam splitter along a second optical path resulting from a reflection of said first light beam transmitted by said matrix optical modulation means,
said first and second optical paths being perpendicular;
It further comprises a non-planar mirror positioned so as to reflect said second light beam, resulting from a reflection on said matrix phase modulation means, into a third light beam reflected to said beam splitter along a third optical path,
said polarizing light beam splitter is configured such that said third light beam reflected by said non-planar mirror along said third optical path is deflected or transmitted by said polarizing beam splitter into a fourth light beam along a fourth optical path.

16. The measuring system according to claim 1 wherein said Schlieren lens is positioned in an optical path between said matrix phase modulation means and said imaging means.

17. The measuring system according to claim 1 wherein said imaging means comprise:
a first and a second converging imaging optical elements configured such that an image focus of one coincides with an object focus of the other at a second convergence point located in a second focusing plane positioned between said first and second converging imaging optical elements;
a fourth selection optical element having a fourth aperture surrounding said second convergence point,
said imaging means being adapted to form an image of said sample from said inspection beam having interacted with said sample on said matrix detection means.

18. The measuring system according to claim 1 wherein said imaging means are imaging means 4F such that:
said first converging optical element is positioned between said Schlieren lens and said fourth selecting means, so that its object focal plane coincides with a plane of said sample and,
said second converging optical element is positioned between said fourth selecting means and said matrix detection means, so that its image focal plane coincides with said matrix detection means.

* * * * *